June 7, 1960  R. D. KAPLAN ET AL  2,939,651
VARIABLE AREA AIR INDUCTION SYSTEM
Filed March 4, 1957  4 Sheets-Sheet 1
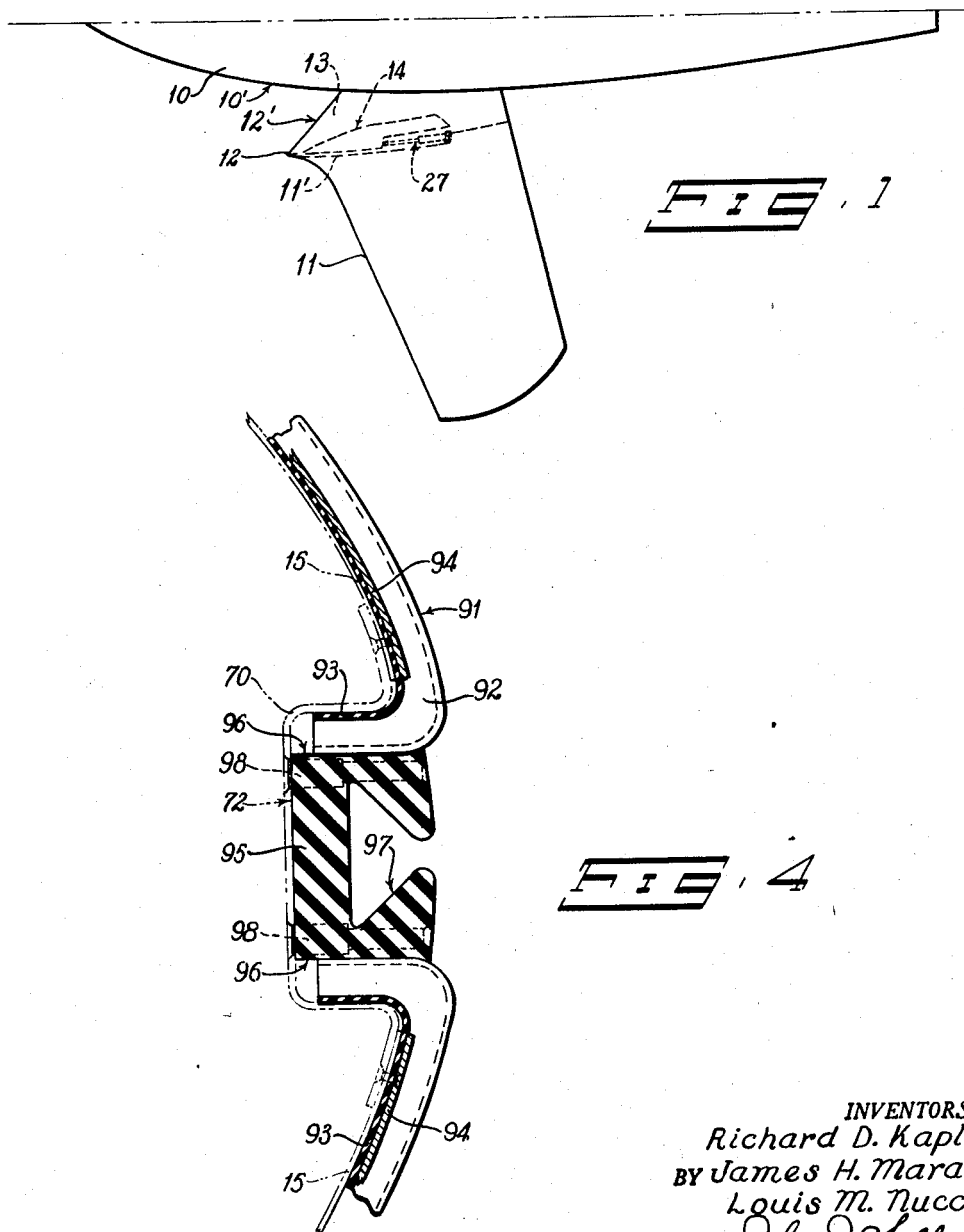
INVENTORS.
Richard D. Kaplan
BY James H. Maravel
Louis M. Nucci
John J. Sullivan
ATTORNEY.

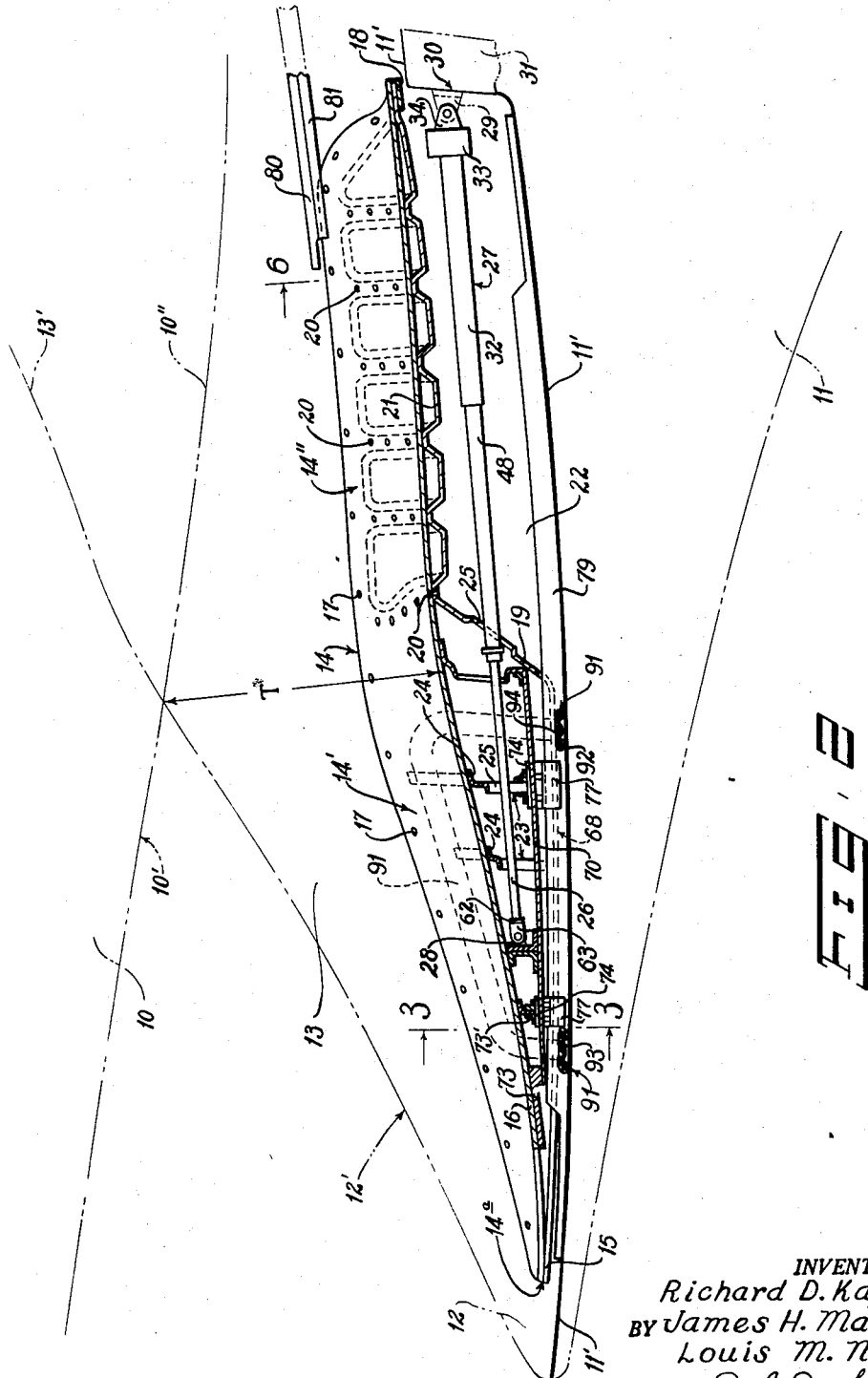

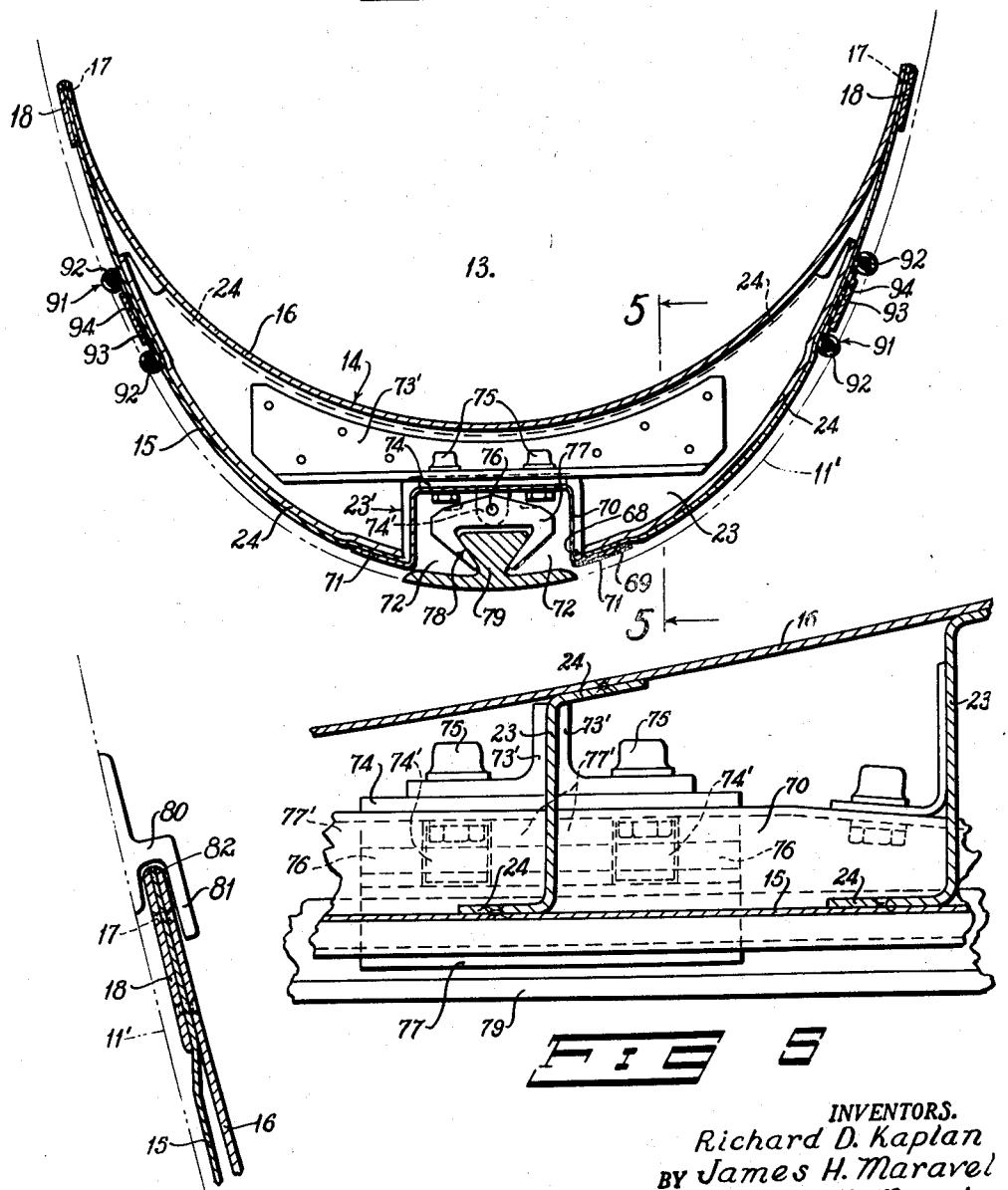

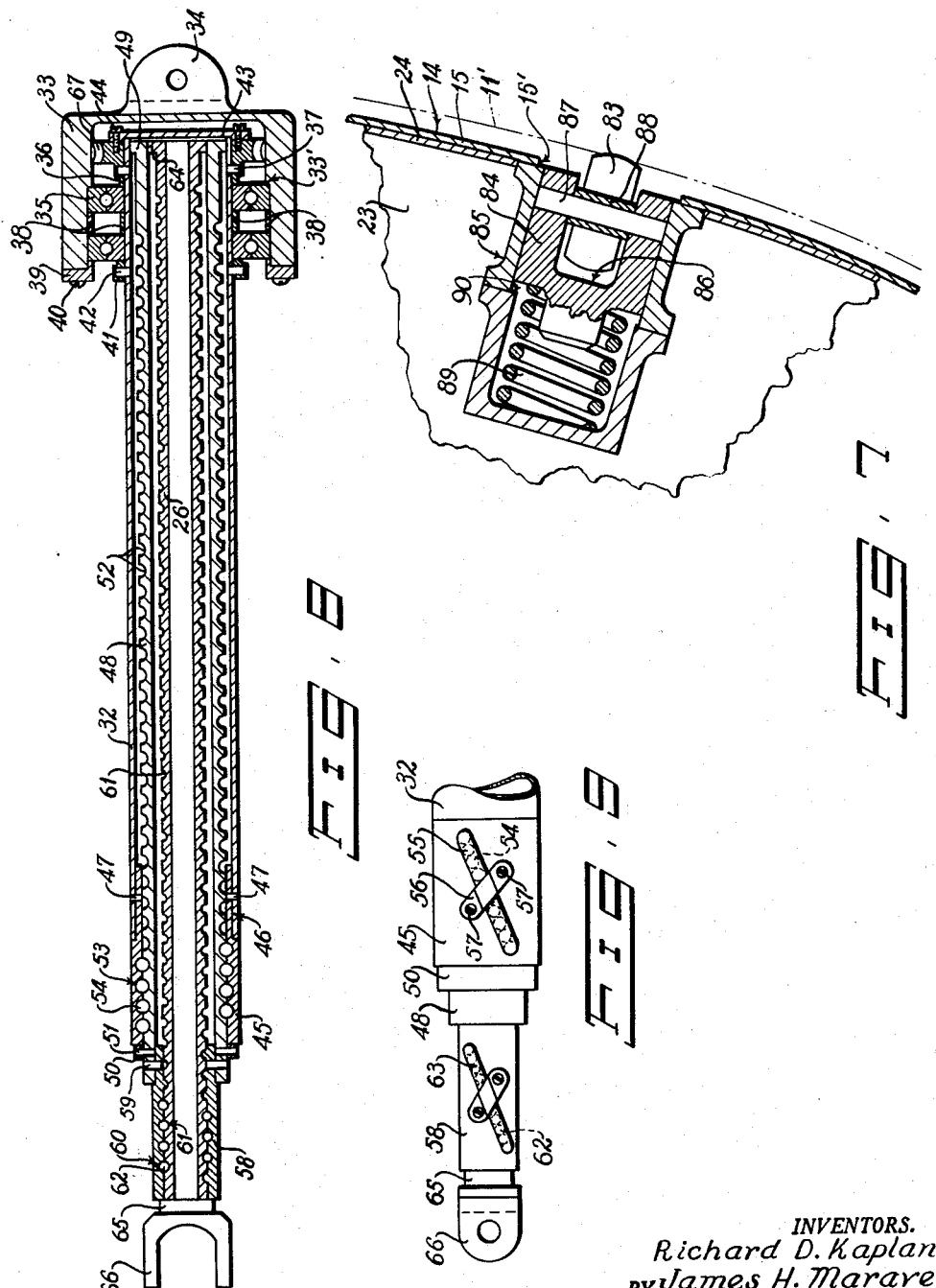

United States Patent Office 2,939,651
Patented June 7, 1960

2,939,651

VARIABLE AREA AIR INDUCTION SYSTEM

Richard D. Kaplan, East Meadow, Louis M. Nucci, Huntington, and James H. Maravel, Setauket, N.Y., assignors to Republic Aviation Corporation, near Farmingdale, N.Y., a corporation of Delaware Filed Mar. 4, 1957, Ser. No. 643,713

15 Claims. (Cl. 244—53)

This invention relates to fluid induction systems for jet engines and more particularly to control means to regulate the flow and delivery of air to the engine whereby maximum operating efficiency of the engine may be maintained at all times.

More specifically, the invention is directed to means by which the effective cross-section area or throat of the air inlet duct of a jet engine, particularly when employed in aircraft, may be adjusted to correspond to the various engine requirements under various operating conditions. In short, the present invention proposes an air intake duct for a jet power plant having a throat, the area of which may be regulated or adjusted to correspond to flight conditions.

Another object of the instant invention is the provision of a movable control member or "plug" situated in the inlet duct and so associated with the throat thereof that it forms a wall of the duct and cooperates with the surrounding airplane structure, regardless of its adjusted position, to the transfer the aerodynamic and thermal loads imposed thereon directly to such structure.

The present invention also contemplates a "plug" or control member of relatively light weight and simple construction adapted to be disposed within the air inlet duct of the jet engine whereby the cross-sectional area of the opening or capture area of said duct remains constant, while the throat or area of the duct defined in part by said member is variable.

At the same time, the design and operation of the control member is such that no part of the mechanism by which it is moved or adjusted relative to the duct is exposed or subjected to any of the loads and pressures of the air entering or passing through the duct.

With the above and other objects in view, as will be apparent, this invention consists in the construction, combination and arrangement of parts all as hereinafter more fully described, claimed and illustrated in the accompanying drawings, wherein:

Fig. 1 is a plan view of one symmetrical half of a jet-powered airplane to show generally the location of the present control member in the air inlet duct thereof which, in the illustrated airplane, is located at the root of the wing;

Fig. 2 is a section taken longitudinally through the control member when disposed in its extreme forward position in the inlet duct to show the mounting thereof and the actuating mechanism therefor, the duct and associated portion of the airplane structure being illustrated in phantom lines;

Fig. 3 is a transverse section through the control member taken along line 3—3 of Fig. 2 to show inter alia its connection to and cooperation with a guide rail secured to an underlying portion of the inlet duct;

Fig. 4 is a transverse section through the air-tight seal substantially surrounding the rail illustrated in Fig. 3 forming a part of the sealing system interposed between the control member or "plug" and the underlying portions of the inlet duct, the control member being shown in phantom lines;

Fig. 5 is a fragmentary section through the control member taken along line 5—5 of Fig. 3;

Fig. 6 is a section taken along line 6 of Fig. 2 through one edge of the control member to show the cooperation of each side thereof with a guiding track mounted on and carried by the underlying portion of the inlet duct, the associated surface of said inlet duct wall being represented by a phantom line;

Fig. 7 is a section through a part of the control member or "plug" to illustrate one of several anti-friction devices carried by and projecting laterally from said control member and adapted to contact and move or roll freely over and along the underlying wall of the air inlet duct which is represented by a phantom line;

Fig. 8 is a longitudinal section of the actuating mechanism for the control member in its fully telescoped or retracted position to show its construction and operation in adjusting the position of said control member in the air inlet duct; and Fig. 9 is an elevation of the effective or driven end of the actuating mechanism to show the means by which the elements thereof are extended and interconnected one to another to be locked in their selected, adjusted position.

While the present invention may be adapted for use wherever it is desired to control fluid flow, i.e., the quantity, velocity and pressure of air being admitted into a jet engine, it finds particular utility in conjunction with the air inlet duct of the jet engine of an airplane. The altitude, speed and range of operation of an airplane, especially in fighter- and pursuit-type of airplanes, is constantly increasing and it has become virtually impossible to produce a single engine capable of efficient performance under all operating conditions.

A jet engine is designed for maximum operating efficiency when supplied with air having subsonic velocity. At the same time, this type of engine is designed to receive a specific volume of air for maximum efficiency and its forward thrust, which determines the speed of the airplane, is directly proportional to the pressure or pounds of air delivered to and taken in by the engine. Thus, three requirements are essential if the engine is to operate at maximum efficiency. First, when the airplane passes from subsonic speeds to sonic and supersonic speeds, the velocity of the air to be delivered to the engine correspondingly increases and this air must be decelerated or converted to subsonic velocity. Second, the volume of air delivered to the engine must remain relatively constant regardless of the speed of the airplane and the velocity of the air. And, third, the pressure of this constant volume of air must increase as the speed of the airplane increases to produce the required thrust.

The present invention proposes, among other things, to meet the above requirements and thereby provide a jet engine which is capable of maximum performance during the entire range of operation of the airplane. To this end, the present invention proposes a generally wedge-shaped control member or "plug" mounted for reciprocation fore and aft in the inlet duct. This member consists of two curved, spaced sheets or plates converging toward the apex of the control member which is directed upstream. One of the sheets or plates rides over and is in substantial flush contact with the surface of the wall defining one side of the air inlet duct. The other sheet of the member is disposed over the first sheet or plate and gradually slopes rearwardly and inwardly of the inlet duct from the apex of the control member to constitute, in effect, the wall of the duct. This sheet or plate is bent to any desired shape or contour to thereby modify and continue the contour of the wall per se of the inlet duct. Hence, it is this sloping element or sheet of the control member that is exposed to and directs the flow of air entering and passing through the air inlet duct.

It is apparent that at some speeds of the airplane, intake air passing through the inlet duct is gradually deflected and compressed as it strikes and passes over the sloping surface of the wedge-shaped control member or "plug" and creates a shock pattern capable of being controlled. At the same time, the velocity of the air passing over the control member is sufficiently reduced to permit it to meet the requirements of the engine for the uniform and efficient operation thereof under a variety of flight conditions. As the flight conditions vary or change, the position of the control member or "plug" changes either automatically or manually to vary the area of the throat of the intake duct to conform to such variations in flight conditions. Also, the present control member is so shaped and disposed in the duct that loads and pressures imposed thereon by the air are transferred from the member to the surrounding structure of the aircraft.

Referring more particularly to the drawings, 10 designates the fuselage of an airplane to which a wing 11 is attached on each side in the conventional manner. At its root-end, each wing 11 is provided with an air intake scoop 12 which projects in a forward direction, i.e., upstream. This scoop 12 opens at the leading edge of the wing 11 and may be defined inboard by the outer surface 10' of the fuselage skin. Outboard, the scoop 12 is defined by an arcuate or concave wall 11', fixedly secured to the interior structure of the wing 11. It is to be observed (Figs. 1 and 2) that the leading edge 12' of the scoop 12 is disposed at an obtuse angle to the fuselage 10 and at an acute angle to the projecting point of the scoop. This construction establishes a rearward V with the skin 10' of the fuselage through which surplus air may escape to flow over the upper and lower surfaces of the wing 11. An air inlet duct 13 is formed inwardly of the scoop 12 between the wall 11' and an inboard wall 13' within the fuselage 10. To this end, the skin 10' of the fuselage 10 is provided with an opening in that portion 10'' thereof adjoining the wing root for the passage therethrough of the duct 13.

The area of the scoop 12 defined by the skin 10' of the fuselage 10 and the wall 11' is generally elliptical or semi-elliptical in section and extends rearwardly into communication with the duct 13 defined by the walls 13' and 11'. This duct 13 extends through the fuselage 10 to terminate at the forward end of the engine, being adapted to convey air captured by the scoop 12 from the airstream to the compressor of the engine. It is to be noted that the walls 10' and 11' converge rearwardly toward throat T of the intake duct 13 while the walls 13' and 11' aft of the throat T diverge rearwardly whereby the cross-sectional area of the duct 13 increases aft of the throat T. The throat T is always the smallest cross-sectional area of the duct 13 and scoop 12 combined, being always located at the forward end of the wall 13'. As will be seen, the area of the throat T may be varied but its position and relation to the scoop 12 and duct 13 is constant.

A control member 14 is mounted within the duct 13 between the wall 10'—13' and 11' and is intended to vary the cross-sectional area of the throat T of the duct. More specifically, the control member or plug 14 comprises a hollow wedge 14' at its forward end and an aft extension or continuation 14'' (Fig. 2). The wedge 14' of the plug 14 is formed by a pair of superposed sheets or plates 15 and 16, riveted or otherwise secured one to the other at and along their forward ends, i.e. at the apex 14a of the wedge. One of the sheets or plates 15 of the wedge 14' is curved to conform to the curvature of and substantially abut the associated concave surface of the wall 11' of the duct 13.

The opposed plate or sheet 16 of the wedge 14' slopes inwardly of the duct 13 away from the wall 11' and plate 15 and is transversely curved to produce a concave surface which, when the wedge is disposed in whole or in part between the throat T and the point of the scoop 12, acts as a substitute for the wall 11'. The adjacent longitudinal edges of the plates 15 and 16 rest flush one against the other and are fixedly secured together by the rivets 17. If required, longitudinal backing strips 18 (Figs. 3 and 6) may be employed adjacent the edges of the plate 15 in opposition to the edges of the plate 16.

The plate 15 of the wedge 14' of the plug 14 terminates in an angularly disposed base wall 19 which constitutes the aft end of the wedge 14'. This base 19 traverses the space between the plates 15 and 16 of the wedge 14' and is bent to extend rearwardly. The aft end of the plate 16 is also extended rearwardly substantially parallel to the wall 11' and is thus disposed at an obtuse angle to the sloping forward portion thereof. By this arrangement, the rearward extension of the plate 16 overlies and rests against the rearward extension of the plate 15 to which it is secured by the rivets 20 or other suitable attaching means.

The rearward extension of the plate 15 is coextensive with the rearward extension of the plate 16 and is corrugated as at 21. Adjacent its aft end, a marginal portion of the edge of the corrugated plate 15 terminates in flush abutment with the inner surface of plate 16 and is also secured thereto by the rivets 17. The backing strip 18, if used, may be extended across the aft end 14'' of the plug 14. By this construction, structural rigidity is incorporated in the aft portion 14'' of the plug assembly 14.

From the foregoing, it is seen that the plug assembly 14 consists generally of a hollow wedge-shaped forebody 14' and a relatively thin tail or afterbody 14''. Moreover, this tail or afterbody 14'' extends from the inboard side of the wedge 14' to create a space 22 defined by the afterbody 14'' of the plug 14 and the wall 11' of the duct 13 wherein the operating mechanism for the plug may be housed, as will be described.

The longitudinal shape of the plug 14 is such that the throat T of the duct 13 is smallest when the plug is disposed in its extreme forward position, i.e., the position shown in Fig. 2. As the plug 14 is moved rearwardly in the duct 13, the throat T thereof becomes larger because of the angle of the plate 16 of the wedge 14'. At the same time, the transverse contour of the plug 14 is such that at every position in its adjustment in the duct 13, it conforms to the surface of the wall 11' to thereby serve as a substitute therefor in defining substantially half of the duct 13. Thus, the angle of the plate 16 to the plate 15 in acting in place of the wall 11' directs the intake air away from the wall 11' and into the duct 13.

The hollow forebody 14' of the plug 14 is reinforced for additional structural rigidity by a plurality of spaced, transverse ribs 23 (Figs. 3 and 5) each of which terminates at its edges in the flanges 24 that rest flush against the inner surfaces of the sides 15 and 16 to which they are riveted or otherwise immovably secured. Each of the ribs 23 in the rear portion of said forebody, as well as the base 19, is pierced centrally by a hole 25 for the passage of a power unit 27.

In practice, the plug assembly 14 is constantly moving to adjust the area of the throat T and this adjustment is accomplished by any suitable power unit 27 the operation of which may be manually, but preferably automatically, controlled. The power unit 27 disclosed in detail in Figs. 8 and 9 is shown by way of example and, in fact, per se forms no part of the present invention. It essentially consists of three telescoping sections, viz., the main cylinder or casing 32, the intermediate cylinder 48 and the inner cylinder 26. When the plug 14 is fully retracted with reference to the scoop 12 and the duct 13, the cylinders 48 and 26 are housed entirely within the main cylinder or casing 32.

The outer end of the inner cylinder 26 is secured by a clevis 66 to one of the ribs 23 by means of an ear 28 attached to that rib. The main cylinder or casing 32 is seated for rotation in a cup 33 which, in turn, is secured by a clevis 34 to an ear 29 carried by a lateral extension 30 of the wall 11'. Thus, while the main cylinder or casing 32 may rotate within the cup 33, it is as will be seen, held against any longitudinal movement with reference to the extension 30 of the wall 11'. At 31, the extension 30 of the wall 11' is reinforced by part of the wing structure.

Since the unit 27 is interposed between a fixed structure 11'—30—31 and the movable plug assembly 14, the projection of the cylinders 48 and 26 from the main cylinder or casing 32 will cause the plug assembly 14 to move forwardly over the wall 11' and conversely the retraction thereof into the main cylinder or casing 32 will cause the plug assembly 14 to move rearwardly over the wall 11'. The forward movement of the plug assembly 14 reduces the area of the throat T while its rearward movement increases the area of such throat.

For accomplishing this, a worm gear 67 is keyed to the end of the cylinder 32 within the cup 33 by an outstanding flange 36 and a pin or rivet 37. This gear 67 is driven by any suitable means for the rotation of the cylinder 32 in either direction. Between the gear 67 and the lip of the cup 33 are disposed ball or roller bearings 35 which permit the free rotation of the casing 32. Spacers 38 are interposed between the bearings 35 while the flange 36 on the gear 67 spaces it from the next-adjacent bearing 35. This assembly is held in place within the cup 33 by a lock ring 39 secured to the lip of the cup by screws 40 with its edge overlapping the periphery of the outer bearing 35. A projection or ring 41 pinned to the housing 32 at 42 coacts with the inner periphery of the outer bearing 35 to hold it in place. A closure plate 43 is attached over the open end of the cylinder 32 and is held in place by the screws 44.

At the end of the casing or main cylinder 32 most remote from the cup 33, is a supplemental cylinder 45 which has a reduced extension 46 projecting into the end of the cylinder 32 where it is secured by rivets 47. The end of the reduced extension 46 of the supplemental cylinder 45 acts as a stop to arrest the outward projection of the intermediate cylinder 48. The supplemental cylinder 45 has a spiral groove 53 therein which is completely filled by a series of balls 54. These balls at the ends of the spiral groove 53 enter a by-pass 55 which is held in place by a strap 56 attached to the exterior of the supplemental cylinder 45 by screws 57.

The exterior surface of the cylinder 48 is provided with a continuous spiral groove 52 which receives the balls 54 when the cylinder 48 passes through the supplemental cylinder 45. Thus, when the main cylinder 32 rotates, these balls coacting with the groove 52 project the cylinder 48 from the open end of the cylinder 32 until a flange 49 on the cylinder 48 contacts the end of the supplemental cylinder 45 which arrests the outward movement of the cylinder 48 and the balls 54 then lock the cylinders 32 and 48 for rotation in unison.

The inner cylinder 26 is provided with a continuous spiral groove 61 in its outer surface and this groove cooperates with the balls 62 carried in the spiral groove 60 provided in the inner surface of a supplemental cylinder 58 which is attached to the extremity of the intermediate cylinder 48, as at 59. A by-pass 63, like the by-pass 55, is similarly and for the same purpose associated with the opposed ends of the groove 60 in the supplemental cylinder 58.

Adjacent and secured at 51 to the outer end of the intermediate cylinder 48 is a stop 50 which abuts the end of the supplemental cylinder 45 of the main cylinder 32 when the intermediate cylinder 48 is fully retracted. Stops 64 and 65 are respectively provided adjacent each extremity of the inner cylinder 26 to abut the adjacent end of the supplemental cylinder 58 when in its extreme positions of extension or retraction.

Upon the rotation of the casing or main cylinder 32 in one direction, the cylinders 48 and 26 can be moved from the positions shown in Fig. 8 to the extended positions shown in Fig. 2 or to any intermediate positions and the plug assembly 14 will be correspondingly and proportionally adjusted. Reversely, upon the rotation of the main cylinder 32 in the opposite direction, the cylinders 48 and 26 will be moved to their fully retracted positions shown in Fig. 8 or to any intermediate positions and the plug assembly 14 will be accordingly adjusted. The spiral grooves 52 and 61 of the intermediate and inner cylinders 48 and 26 respectively as well as other details of the power unit are not shown in Fig. 2 for clarity of illustration. So far as the power unit 27 is concerned, Fig. 2 is schematic.

In order to reciprocate the plug 14 fore and aft in the inlet duct 13, guide and track means are provided. To this end, the plate or sheet 15 is interrupted at its transverse center by a longitudinal slot 68 which extends the full length of the forebody 14' of the plug 14. The edges of the sheet 15 adjacent the slot 68 are offset or stepped inwardly of the wedge 14', as at 69 (Fig. 3). A trough 70 is disposed within the slot 68 to open outwardly of the wedge 14' and thereby define a longitudinal channel 72. This trough 70 terminates at each of its edges in a lip or flange 71 designed and adapted to rest flush against the outer surface of the offset portion 69 of the plate 15 to which it is riveted or otherwise fixedly secured. The length of the trough 70 is such that it extends from a point aft of the apex 14a to the end of the forebody 14' of the plug assembly 14.

At its forward end, the trough 70 is secured to plate 16 of the forebody 14' by means of and through a rib 73 (Fig. 2) which abuts the outer surface of the bottom or base of the trough 70 and the under surface of the plate 16. The several ribs 23 transversely disposed within the forebody 14' of the plug assembly 14 are cut or notched, as at 23', to permit the passage of the trough 70 therethrough (Fig. 3). Angle brackets 73' may be employed to rigidly connect the ribs 23 to the outer surfaces of the trough 70 whereby the trough becomes fixedly secured to the plate 16, as well as to the plate 15.

At least two spaced hinge fittings 74 (Figs. 2, 3 and 5) are fixedly secured to and rest upon the outer face of the base of the trough 70 by bolts 75. Adjacent each hinge fitting 74, the base of the trough 70 is pierced by a slot for the passage of the spaced eyes 74' of such fittings 74 which project into the channel 72. Complementary and coacting spaced eyes 77' extending laterally from a rail-engaging skid 77 interlock or register with the eyes 74' of each hinge fitting 74 and a pin 76 passing through the aligned eyes pivotally interconnects the skid 77 to the fitting 74.

Each skid 77 is formed with a central triangularly shaped groove 78, the open apex of which faces the wall 11' of the inlet duct 13 to receive and retain a guide rail 79 having a transverse section which conforms to the shape of the groove 78. This rail 79 is considerably longer than the trough 70 to the end that it is always engaged by the skids 77 regardless of the position of the plug assembly 14 in its reciprocation relative to the inlet duct 13.

In conjunction with the rail 79 and skids 77, the plug assembly 14 is also engaged at its edges by a pair of tracks 80. Each of these tracks 80 is secured to the surface of the wall 11' defining the inlet duct 13 and terminates at one of its sides in a lip 81 disposed parallel to and spaced from the wall 11' to thereby define a longitudinal channel 82 adapted to receive and retain the adjoining edge of the plug assembly 14, i.e. where the edges of the plates 15 and 16 are united. Each of the tracks 80 extends from a position overlapping the aft end of the plug assembly 14 when the plug is disposed in its extreme forward position aftward a distance substantially equal to the length of the rail 79 whereby the edges of the plug 14 are always engaged by said tracks and contained therein in every position in its adjustment. Thus, the tracks 80 together with rail 79 cooperate one with the other to connect the plug 14 to the wall 11' of the inlet duct 13 and to guide and control reciprocal movement of the plug 14 relative to the duct 13 at all times.

To facilitate the movement of the plug assembly 14 relative to the inlet duct 13 and to eliminate friction between the plate 15 and the wall 11' of the inlet duct 13, a number of anti-friction devices are employed. Each of these devices comprises a roller 83 (Fig. 7) mounted within and projecting at right angles from the wedge 14'. More specifically, each of the rollers 83 is disposed centrally in and carried by a spring-loaded plunger 84 mounted for reciprocation in a container or cup 85. This cup 85 is contained or housed within the wedge 14', being secured at its outer lip to the inner surface of the plate 15 in any suitable manner whereby the cup 85 is laterally disposed relative to plate 15 and opens outwardly thereof. A hole 15' is provided in the plate 15 in alignment with the cup 85 to permit the roller 83 to project outwardly beyond the plate 15 for rolling contact on and against the wall 11' of the duct 13.

The roller 83 is seated within and projects outwardly from a recess or cavity 86 in the outer end of the plunger 84 being mounted for rotation on a shaft 87 secured to and projecting laterally from the sides of the plunger defining the recess 86. For this purpose, a bearing 88 is provided on the portion of the shaft 87 within the recess 86 on which the roller 83 is operative. Resilient means, such as, for example, compression spring 89, is disposed within the cup 85 and operates between the base of the cup and the inner end of the plunger 84 to constantly urge the plunger and roller 83 outwardly and thereby maintain the roller 83 in bearing contact against the wall 11'. The internal wall of the cup 85 is provided with a shoulder 90 projecting into the path of movement of the plunger 84 to limit its movement inwardly of the cup 85 and against the action of the spring 89. This always insures the projection of the roller 83 beyond the surface of the plate 15.

From the foregoing it is apparent that the construction and design of the plug assembly 14 is such that it is contained within the inlet duct 13, being secured throughout its length to the wall 11' thereof. Contact between adjacent surfaces of the plug 14 and the surface of wall 11' is made by means of and through the several rollers 83. Hence, the plate 15 of the wedge 14' is spaced from the wall 11' a distance at least equal to the projecting portions of the rollers 83. In order to seal this space against the passage of air from the airstream, a seal 91 is interposed between wall 11' and the plate 15 and is secured to the surface of the latter.

This seal 91 may be molded rubber or equivalent material and formed by a pair of enlarged tubular edges 92 interconnected by a relatively flat web 93. Silicone sponge or the like may be employed as a core within the tubular edges 92, and the entire outer surface of the seal 91 may be coated with Teflon or a similar abrasive-resisting material. The seal 91 is continuous on each side of the trough 70 and is shaped to traverse the forebody 14' of the plug 14 adjacent the opposite ends thereof and to extend longitudinally along its edges (Fig. 2). An attaching plate 94 is disposed flush against the outer surface of web 93 to clamp the seal between it and the plate 15 of the forebody 14' to which it is riveted or otherwise secured.

At the intersections of the seal 91 and the longitudinal channel 72 in the wedge 14' adjacent opposite ends thereof, a sealing block 95 is provided (Fig. 4). This block 95 is formed or molded of rubber or comparable material coated with Teflon to conform to the shape of the channel 72 and be received and press-fitted in the trough 70. Each block 95 is recessed, as at 96, to receive and snugly compress the ends of the seal 91 against it and the sides of the trough 70. The outer face of each block 95 is formed with a groove 97 conforming in shape to that of the guide rail 79 to thereby overlie and matingly receive and engage the rail at all times. If desired, a number of rivets or other fastening means 98 may be employed to further secure the block 95 to and in the trough 70.

What is claimed is:

1. The combination with an airplane having a jet power plant, of an inlet duct having an angularly disposed leading edge terminating in a point upstream to constitute a scoop to capture and convey air from the airstream to the power plant, a wedge composed of a pair of superposed concave-convex plates positioned within and on one side only of the duct with the convex surface of one of said plates resting substantially flush against the wall of the duct and the concave surface of the other plate sloping rearwardly from one end of and away from the first plate, the forward ends of said plates being secured together and the edges thereof disposed longitudinally of the duct being juxtaposed and secured together whereby the sloping plate becomes a substitute for a circumferential portion of the wall of the duct underlying the first plate in directing air through the duct and combines with the remaining circumferential portion of the wall of the duct to define a fixed throat within the duct, and means connected to said wedge to reciprocate it within the duct to vary the area of said throat.

2. The combination with an airplane having a jet power plant, of an inlet duct having a generally elliptical cross-section with one side thereof projecting upstream and in spaced relation to the airplane to define a fixed capture area and convey air from the airstream to said power plant, a control plug asymmetrically disposed totally within said duct at all times comprising a forebody having two convergent faces each shaped to conform generally to the contour of the wall of the duct, one face resting over and substantially flush against a part of the wall of the duct and the other face sloping away from the first face and extending rearwardly in the duct, an afterbody extending rearwardly from the aft end of the sloping face of the forebody in spaced relation to said part of the duct wall, and extensible and retractable operating means mounted in the space between the afterbody and the duct wall and connected at its opposed ends to the forebody and fixed structure of the airplane for adjusting the position of the plug longitudinally in the duct.

3. The combination with an airplane having a jet power plant, of an inlet duct having a semi-elliptical upstream entrance with an angularly disposed lead-edge terminating in a point projecting upstream and spaced from the airplane to convey air from the airstream to the power plant, a wedge disposed at all times totally within the duct to one side thereof and having one surface resting substantially flush against the internal surface of said duct and a second surface angularly disposed relative to the first surface, said second surface extending radially inwardly of the duct for cooperation with the opposed side of the duct wall to thereby reduce the cross-sectional area of the duct, and a power unit housed within said wedge and operative between fixed structure of the airplane and said wedge for the adjustment of its position in the duct to thereby vary the effective cross-sectional area of the duct.

4. The combination with an airplane having a power plant, of an air inlet duct terminating in a fixed scoop opening to forwardly receive the airstream and extending to said power plant for the delivery of air thereto, an angularly disposed member asymmetrically mounted on the wall of said duct adjacent the scoop for fore and aft reciprocation to thereby reduce the effective cross-sectional area of the duct aft of the scoop, the edges of said member merging with the surrounding wall of the duct to form a smooth continuation thereof, and means for reciprocating said member to regulate the flow of air through the duct.

5. The combination with an airplane having a jet engine, of an air inlet duct having an internal fixed throat to convey air to the jet engine, a control to vary the cross-sectional area of the throat comprising a plug having a wedge-shaped forebody asymmetrically disposed in the duct with its apex upstream, a longitudinal rail fixed to and extending inwardly of the duct, a mount carried by the forebody of the plug adapted to receive and slidably engage said rail with one surface of the forebody resting substantially flush against the duct wall and its other surface projecting radially inwardly of the duct to define one side of said throat, a track carried by the duct adjacent each transverse side of the plug to receive each longitudinal edge of the plug and guide its movement along the rail, and means disposed externally of the air passage in the duct to reciprocate the plug along the rail whereby the position of the inwardly projecting surface of the forebody of the plug varies the area of the throat in the duct.

6. The combination with an airplane including a jet engine, of an inlet duct for conveying air to the engine having forwardly divergent walls terminating in a fixed scoop disposed in the airstream and an internal fixed throat, a control member to vary the cross-sectional area of said throat comprising a plug having a wedge-shaped forebody disposed in the duct with its apex upstream in the scoop and one surface substantially flush against a wall of the duct and its other surface sloping inwardly of the duct aft of the apex of the forebody to be disposed adjacent the throat and an integral afterbody extending rearwardly from said forebody in alignment with the sloping surface of the forebody, a fixed rail secured to and projecting laterally from the wall of the duct, a mount carried by the forebody of the plug to receive and slidably engage said rail, tracks secured to the wall of the duct for sliding cooperation with the marginal longitudinal edges of the afterbody whereby to coact with the aforesaid rail in guiding the plug in its reciprocable movement in the duct, and an extensible and retractable actuator housed in part within and secured to the forebody and projecting therefrom for connection at its opposite end to fixed structure of the airplane, said projecting end being disposed between the afterbody and the adjacent underlying duct wall.

7. The combination with an airplane having a fuselage housing a jet engine and wings secured to the fuselage, of an air scoop at and projecting forwardly of the root-end of each wing from the leading edge thereof, a duct extending internally of the airplane from and contiguous to said scoop and opening at its other end into the engine for the delivery of air therethrough a plug mounted in the scoop and adjacent end of the duct formed by a pair of plates spaced medially one from the other and joined at their edges, the surface of one of said plates resting substantially flush against the wall of the duct and the other sloping inwardly of the duct away from the first plate, a fixed rail carried by and projecting from the adjacent walls of the scoop and duct, at least one skid secured to the plate of the plug adjacent the wall aforesaid to slidingly engage said rail, guides secured to said wall on each side of the rail to receive the longitudinal edges of a plug, and an actuator secured to said plates at one end and to fixed structure of the airplane at the opposite end and disposed between said plates for reciprocating the plug within the duct along the wall aforesaid.

8. The combination with an airplane having a fuselage housing a jet engine and wings attached to the fuselage, of an air scoop situated in the leading edge of each wing at the root-end thereof, a duct extending internally of the airplane from each air scoop to the engine for the delivery of air therethrough, said duct being defined inboard by the fuselage and outboard by a concave wall secured to the wing to be disposed transversely thereof, a plug mounted on said concave wall consisting of a forebody formed of a pair of concave plates one being a base plate disposed in substantial abutment against the concave wall and the other being secured at its forward end to the corresponding end of the base plate and sloping inwardly of the duct away from the base plate to combine with the adjacent wall of the fuselage to create inwardly convergent duct walls and establish a fixed throat and an afterbody extending rearwardly from the aft end of and forming a continuation of said sloping plate, the edges of the plates of the forebody and afterbody being convergent and being secured one to the other, a rail centrally disposed and fixed to the concave wall, at least one skid projecting outwardly from the base plate of the forebody to engage and slide on said rail, guides carried by the concave wall to receive the opposed edges of the afterbody to direct the movement of the plug relative to the concave wall, and an extensible actuator interposed between the forebody and a stationary part of the airplane structure underlying the afterbody to regulate the position of the plug within the duct and thereby adjust the area of the throat.

9. The combination with an airplane having a fuselage housing a jet engine and wings attached to the fuselage, of an air scoop situated in the leading edge of each wing at the root-end thereof, a duct extending internally of the airplane from each air scoop to the engine for the delivery of air therethrough, said duct being defined inboard by the fuselage and outward by a concave wall secured to the wing to be disposed transversely thereof, a plug mounted for reciprocation on said concave wall consisting of a forebody formed of a pair of concave plates one being a base plate disposed substantially flush against the concave wall and the other being secured at its forward end to the corresponding end of the base plate and sloping inwardly of the duct away from the base plate to combine with the adjacent wall of the fuselage to create inwardly convergent duct walls and establish a fixed throat in the duct, the aft end of the base plate being angularly deflected toward the sloping plate to unite with an extension at the aft end thereof to constitute an afterbody of the plug, a seal interposed between the base plate and the concave wall to prevent the passage of air between the forebody and said wall, and an actuator disposed between the concave wall and the afterbody and secured at one of its ends to the forebody and at its opposite end to fixed structure of the airplane, said actuator being operative to regulate the position of the plug within the duct and thereby adjust the area of the throat.

10. The combination with an airplane having a jet engine and wings, of an air scoop extending from the leading edge of each wing in the direction of flight of the airplane, a tapered air inlet duct in each wing communicating with the scoop of that wing and the engine for the delivery of air from the airstream to the engine, and a control operative within said duct to vary its cross-sectional area at a stationary predetermined point comprising a wedge-shaped plug having one of its sides shaped to conform to and overlie the internal surface of the duct and its opposite side sloping radially inwardly and rearwardly of the duct to establish a reduced throat within the duct, anti-friction means interposed between the coacting side of the plug and the internal surface of the duct, sealing means between the internal surface of the duct and the adjacent surface of the plug, and an actuator disposed entirely within said plug for the fore and aft reciprocation of the plug in the duct to thereby regulate and adjust the position of said inwardly sloping side thereof in the duct and vary the area of said throat.

11. The combination with an airplane having a jet engine and an inlet duct to convey air from the airstream to said engine, of a wedge-shaped control disposed within said duct, a longitudinal rail mounted on and carried by the internal surface of the duct, at least one hinged skid secured to and projecting from the control to engage the rail for sliding cooperation therewith, guide tracks carried by the duct at the sides of the control to receive and retain such sides, rollers resiliently mounted on and projecting laterally from the control to contact the associated surface of the duct, an air-tight seal carried by the control adjacent its edges and in constant contact with the associated surface of the duct, said seal being adapted to matingly receive and engage said rail, and means for moving the control fore and aft in the duct on the rail whereby to vary the effective cross-sectional area of the duct.

12. The combination with an airplane having a jet engine and an inlet duct to convey air from the airstream to the engine, of a fixed scoop at the forward end of said duct projecting upstream into the airflow, a plug asymmetrically mounted in said scoop and extending rearwardly into the duct for longitudinal movement therein always aft of the leading edge of the scoop comprising a wedge-shaped forebody having a base surface resting substantially flush against the internal surface of the scoop and duct and its opposed surface sloping inwardly of the duct from the forward end of the base surface and an afterbody extending rearwardly from the inner end of said sloping surface, the edges of said forebody and said afterbody merging with the adjacent surface of the duct to thereby form an aerodynamically clean continuation thereof at all times during its movement as aforesaid with said sloping surface combining with the remainder of the duct surface to define the total cross-sectional area of the duct including a fixed throat, a power unit housed in part within said forebody and in part under said afterbody to thereby be disposed externally of the air passage of the duct and connected between fixed structure of the airplane and said forebody for the adjustment of the plug longitudinally of the duct to vary the cross-sectional area of the duct, and guides carried by the duct to coact with the plug and determine its path of movement within the duct.

13. The combination with an airplane having a jet engine and an inlet duct to convey air to the engine, of a scoop extending forwardly from one side of said duct to be disposed in the airstream for the capture of air therefrom, a wedge-shaped member consisting of a pair of converging plates, one of said plates conforming to and resting substantially flush against the internal surface of said scoop and the other plate being transversely curved and sloping inwardly and aftwardly of the duct from the forward end of the first plate to coact with the opposed wall of the duct to define the effective cross-sectional area of the duct and to establish a fixed throat in the duct, and a power unit connected to said wedge-shaped member at one of its ends and to fixed structure of the airplane at its other end whereby the member is reciprocated longitudinally of the duct to vary the effective cross-sectional area of said fixed throat.

14. The combination with an airplane having a jet power plant, of an inlet duct including an open mouth to capture and convey air to said power plant, a wedge-shaped control member eccentrically mounted at all times within said duct and disposed in substantial abutment against the wall on one side only of said duct at all times, said member having an apex aft of the mouth of the duct and a surface extending rearwardly from said apex and sloping radially inwardly from the wall of said duct and merging at its sides with the duct wall to thereby combine and cooperate with said duct wall to form the internal contour of the duct and establish a throat therein, and means for adjusting the position of the control member longitudinally of the duct to vary the cross-sectional area of said throat without affecting the cross-sectional area of said mouth.

15. The combination with an airplane having a jet power plant, of an air inlet duct opening in the airstream to capture and convey air to said power plant, a control member disposed eccentrically in the duct overlying a localized area of the wall on one side of said duct, said control member being slidably mounted on a fixed rail carried by the duct and having a surface sloping inwardly from said wall toward the transverse center of the duct to form an aerodynamically clean continuation of the remaining portion of said wall of the duct to combine therewith in establishnig a throat in the duct between said member and the remainder of the wall of the duct, and means for adjusting the position of said member longitudinally in the duct whereby the cross-sectional area of said throat is varied.

References Cited in the file of this patent

UNITED STATES PATENTS

| | | |
|---|---|---|
| 2,540,594 | Price | Feb. 6, 1951 |
| 2,632,295 | Price | Mar. 24, 1953 |
| 2,638,738 | Salter | May 19, 1953 |
| 2,829,490 | Kresse | Apr. 8, 1958 |

FOREIGN PATENTS

| | | |
|---|---|---|
| 709,300 | Great Britain | May 19, 1954 |